(12) United States Patent
Ogg et al.

(10) Patent No.: US 7,778,939 B2
(45) Date of Patent: Aug. 17, 2010

(54) OUTBOUND MAIL PIECE TRACKING

(75) Inventors: Craig L. Ogg, Long Beach, CA (US); Akbar A. Thobhani, Santa Monica, CA (US)

(73) Assignee: Stamps.com Inc., Los Angeles, CA (US)

( * ) Notice: Subject to any disclaimer, the term of this patent is extended or adjusted under 35 U.S.C. 154(b) by 807 days.

(21) Appl. No.: 10/747,936

(22) Filed: Dec. 29, 2003

(65) Prior Publication Data

US 2005/0144145 A1    Jun. 30, 2005

(51) Int. Cl.
    *G06Q 30/00*    (2006.01)
(52) U.S. Cl. ...................................... 705/333
(58) Field of Classification Search ................... 705/333
    See application file for complete search history.

(56) References Cited

U.S. PATENT DOCUMENTS

| | | | |
|---|---|---|---|
| 5,262,623 A | 11/1993 | Batterman et al. | |
| 5,510,992 A | 4/1996 | Kara | |
| 5,573,277 A | 11/1996 | Petkovsek | |
| 5,612,889 A | 3/1997 | Pintsov et al. | |
| 5,626,286 A | 5/1997 | Petkovsek | |
| 5,682,318 A | 10/1997 | Kara | |
| 5,717,597 A | 2/1998 | Kara | |
| 5,737,729 A * | 4/1998 | Denman | 705/401 |
| 5,801,944 A | 9/1998 | Kara | |
| 5,812,991 A | 9/1998 | Kara | |
| 5,848,401 A | 12/1998 | Goldberg | |
| 5,923,406 A | 7/1999 | Brasington et al. | |
| 6,010,156 A | 1/2000 | Block | |
| 6,192,165 B1 | 2/2001 | Irons | |
| 6,208,980 B1 | 3/2001 | Kara | |
| 6,244,763 B1 | 6/2001 | Miller | |
| 6,296,404 B1 | 10/2001 | Pierce et al. | |
| 6,415,983 B1 | 7/2002 | Ulver et al. | |
| 6,419,782 B1 | 7/2002 | Johnson et al. | |
| 6,424,954 B1 | 7/2002 | Leon | |
| 6,427,021 B1 | 7/2002 | Fischer et al. | |
| 6,461,063 B1 | 10/2002 | Miller et al. | |

(Continued)

FOREIGN PATENT DOCUMENTS

WO     0049580     8/2000

OTHER PUBLICATIONS

Watson, Neva, "Changes to the Domestic Mail Manual to Implement Confirm (R)—Service," 67 FR 53454, Aug. 15, 2002.*

(Continued)

*Primary Examiner*—John W Hayes
*Assistant Examiner*—Nathan Erb
(74) *Attorney, Agent, or Firm*—Khorsandi Patent Law Group, A Law Corp.; Marilyn R. Khorsandi (57) ABSTRACT

The exemplary embodiment of the present invention provides a way for low-volume mailers to track individual outbound mail pieces, including tracking of individual U.S. Postal Service FIRST-CLASS MAIL® letters. The exemplary embodiment of the present invention encodes a unique mail piece tracking identifier as a CONFIRM® service identifier in a graphic symbology. The unique mail piece tracking identifier of the exemplary embodiment of the present invention conforms with requirements of a CONFIRM® service identifier, while at the same time, provides, for a defined period of time, mail-piece-level uniqueness for first class and other mail class mail piece tracking.

26 Claims, 6 Drawing Sheets

U.S. PATENT DOCUMENTS

| | | | |
|---|---|---|---|
| 6,505,179 | B1 | 1/2003 | Kara |
| 6,505,980 | B1 | 1/2003 | Allday |
| 6,557,755 | B1 | 5/2003 | Pickering et al. |
| 6,592,027 | B2 | 7/2003 | Kovlakas |
| 6,594,374 | B1 | 7/2003 | Beckstrom et al. |
| 6,655,579 | B1 | 12/2003 | Delman et al. |
| 6,687,684 | B1 | 2/2004 | Whitehouse et al. |
| 6,701,304 | B2 | 3/2004 | Leon |
| 6,722,563 | B1 | 4/2004 | Johnson et al. |
| 6,722,565 | B2 | 4/2004 | Takeuchi et al. |
| 6,735,575 | B1 | 5/2004 | Kara |
| 6,820,201 | B1 | 11/2004 | Lincoln et al. |
| 6,834,273 | B1 | 12/2004 | Sansone et al. |
| 7,069,253 | B2 * | 6/2006 | Leon .......................... 705/408 |
| 7,085,725 | B1 | 8/2006 | Leon |
| 7,117,363 | B2 | 10/2006 | Lincoln et al. |
| 7,149,726 | B1 | 12/2006 | Lingle et al. |
| 7,162,460 | B2 | 1/2007 | Cleckler et al. |
| 7,191,158 | B2 | 3/2007 | Ogg et al. |
| 7,194,957 | B1 | 3/2007 | Leon et al. |
| 7,243,842 | B1 | 7/2007 | Leon et al. |
| 2001/0042052 | A1 | 11/2001 | Leon |
| 2002/0023057 | A1 | 2/2002 | Goodwin et al. |
| 2002/0046195 | A1 | 4/2002 | Martin et al. |
| 2002/0051205 | A1 | 5/2002 | Teranishi et al. |
| 2002/0073039 | A1 | 6/2002 | Ogg et al. |
| 2002/0083020 | A1 | 6/2002 | Leon |
| 2002/0083021 | A1 | 6/2002 | Ryan, Jr. et al. |
| 2003/0037008 | A1 | 2/2003 | Raju |
| 2003/0046103 | A1 | 3/2003 | Amato et al. |
| 2003/0089765 | A1 | 5/2003 | Kovlakas |
| 2003/0101143 | A1 * | 5/2003 | Montgomery et al. ......... 705/62 |
| 2003/0101147 | A1 | 5/2003 | Montgomery et al. |
| 2003/0101148 | A1 | 5/2003 | Montgomery et al. |
| 2003/0217017 | A1 | 11/2003 | Willoughby et al. |
| 2004/0044586 | A1 | 3/2004 | Gullo et al. |
| 2004/0215478 | A1 * | 10/2004 | Baker et al. .................... 705/1 |
| 2005/0065892 | A1 | 3/2005 | Ryan et al. |
| 2005/0065897 | A1 | 3/2005 | Ryan, Jr. et al. |
| 2005/0125367 | A1 | 6/2005 | Ogg et al. |
| 2005/0195214 | A1 | 9/2005 | Reid et al. |
| 2006/0020505 | A1 | 1/2006 | Whitehouse |
| 2006/0041519 | A1 | 2/2006 | Ogg et al. |
| 2006/0095391 | A1 | 5/2006 | Cordery et al. |
| 2007/0100672 | A1 | 5/2007 | McBride et al. |
| 2008/0007625 | A1 | 1/2008 | Reid et al. |

OTHER PUBLICATIONS

"Need more trackits?", 4 pages http://www.trackmymail.com, 8341 Beechcraft Ave., Gaithersburg, MD 20879, 888-444-9972 or 310-924-2373, not dated.

"Direct Mail Tracking Online, Real-Time At Your Fingertips", 18 pages, http://www.trackmymail.com/, printed Dec. 3, 2003.

Endicia Internet Postage, 3 pages http://www.endicia.com/, printed Dec. 29, 2003.

Rupert Steiner, "It's in the mail: a personalized postcode for life", an article about Royal Mail picture stamps, date unknown (prior to Jul. 27, 2004), publication unknown, 1 page.

Notice of Allowance for U.S. Appl. No. 10/197,044, pp. 1-10, dated Nov. 24, 2008, USPTO.

Notice of Allowance for U.S. Appl. No. 09/975,532, now Pat. No. 7,191,158, pp. 1-8, dated Sep. 6, 2006, USPTO.

Office Action for U.S. Appl. No. 10/731,992, pp. 1-18, dated May 28, 2008, USPTO.

Office Action for U.S. Appl. No. 10/731,992, pp. 1-31, dated Jan. 21, 2009, USPTO.

Notice of Allowance for U.S. Appl. No. 10/608,548, now Pat. No. 7,162,460, pp. 1-8, dated Sep. 5, 2006, USPTO.

Office Action for U.S. Appl. No. 10/922,334, pp. 1-20, dated Oct. 28, 2008, USPTO.

Notice of Allowance for U.S. Appl. No. 10/994,768, now Pat. No. 7,243,842, pp. 1-8, dated Jan. 5, 2007, USPTO.

Notice of Allowance for U.S. Appl. No. 11/635,871, pp. 1-12, dated Nov. 17, 2008, USPTO.

J.P. Leon; "Mail Piece Processing"; U.S. Appl. No. 12/316,542, filed Dec. 11, 2008 (including specification pp. 1-58 and drawings pp. 59-72).

Office Action for U.S. Appl. No. 10/731,992, dated Jul. 29, 2009, pp. 1-37, USPTO.

Office Action for U.S. Appl. No. 10/922,334, dated Apr. 23, 2009, pp. 1-30, USPTO.

Office Action for U.S. Appl. No. 10/922,334, dated Nov. 9, 2009, pp. 1-28, USPTO.

United States Patent Office; Office Action dated Apr. 16, 2007 for Ogg et al.; Computer Postage and Mail Tracking Labels; U.S. Appl. No. 10/731,992, filed Dec. 8, 2003.

United States Patent Office; Office Action dated Nov. 1, 2007 for Ogg et al.; Computer Postage and Mail Tracking Labels; U.S. Appl. No. 10/731,992, filed Dec. 8, 2003.

United States Patent Office; Office Action dated Nov. 19, 2007 for Ogg et al.; Automated Handling of Computer-Based Postage System Printing Errors; U.S. Appl. No. 10/922,334, filed Aug. 20, 2004.

Stamps.com Inc., Santa Monica, CA 90405, Stamps.com 3-Part Multi-Purpose Labels SDC-3100, 1 p.

Stamps.com Inc., Santa Monica, CA 90405, Stamps.com 2-Part Window Envelope Labels SDC-2300, 1 p..

Trackmymail.com, Gaithersburg, MD 20879, Commercial paper advertising trackmymail.com, 4 pp.

Trackmymail.com, Gaithersburg, MD 20879, Pages printed from www.trackmymail.com website, 18 pp.

Notice of Allowance for U.S. Appl. No. 10/731,992, dated Feb. 25, 2010, USPTO, pp. 1-9.

* cited by examiner

OUTBOUND MAIL PIECE TRACKING

CROSS REFERENCE TO RELATED APPLICATIONS

This application is related to co-pending U.S. patent application Ser. No. 10/731,992, entitled "COMPUTER POSTAGE AND MAILING TRACKING LABELS," filed on Dec. 8, 2003; U.S. patent application Ser. No. 09/975,532, filed Oct. 10, 2001, entitled "SYSTEM AND METHOD FOR PROVIDING COMPUTER-BASED POSTAGE STAMPS," which claims the benefit of U.S. Provisional Application No. 60/239,424, filed Oct. 10, 2000, entitled "A SYSTEM AND METHOD FOR PROVIDING COMPUTER BASED POSTAGE STAMPS"; U.S. patent application Ser. No. 09/905,329, filed Jul. 13, 2001, entitled "WEB-ENABLED VALUE BEARING ITEM PRINTING"; U.S. patent application Ser. No. 09/585,025, filed Jun. 1, 2000 and entitled "ON-LINE VALUE BEARING ITEM PRINTING"; and U.S. patent application Ser. No. 10/197,044, entitled "GENERIC VALUE BEARING ITEM LABELS", filed Jul. 16, 2002, all of which have been, or will be, commonly assigned, the entire contents and disclosures of all of which are hereby incorporated by reference for all purposes as if fully set forth herein.

FIELD OF THE INVENTION

The field of the present invention is postal systems, and particularly, postal tracking systems.

BACKGROUND OF THE INVENTION

CONFIRM® service is a product offered by the United States Postal Service. U.S. Postal Service Publication 197 ("Publication 197") describes in detail various aspects of the CONFIRM® service and CONFIRM® service interfaces; Publication 197 is incorporated by reference in full herein for all purposes as if fully stated herein.

CONFIRM® is a mail tracking service of PLANET™ Codes that provides electronic tracking information to USPS customers about their First-Class, Standard letter-size, flat mail and periodicals. CONFIRM® provides advance delivery information about incoming hard-copy reply mail ("Origin CONFIRM®") and outbound mail ("Destination CONFIRM®").

In order to track mail, CONFIRM® uses a combination of two tracking numbers: a 5- or 11-digit POSTNET (POStal Numeric Encoding Technique) Code and a 12- or 14-digit PLANET™ Code. The POSTNET and PLANET™ Codes must be encoded as a barcode and applied to the mail piece.

In order to facilitate mail handling and optical reading equipment processing of mail by the USPS and to properly interpret PC Postage, addressee information, and CONFIRM® tracking information, postage indicia and related labels need to be applied according to USPS guidelines. USPS guidelines directed to the margins, label sizes, and placement of postage indicia, and the size, placement, and other characteristics of POSTNET and PLANET™ bar codes, and any facing identification mark (FIM) on mail pieces are described in the Domestic Mail Manual (DMM) and Title 39, Code of Federal Register (CFR), Part 111, the contents of which are incorporated by reference in full herein for all purposes.

As each mail piece progresses through to its destination, the CONFIRM® barcode on each mail piece is scanned at the different USPS processing facilities through which it passes. Electronic information for each scan is captured and is sent to a centralized network service, which collects the scan data and packages it for use by USPS customers. The electronic scan information is then electronically transferred from the centralized network and is made available in two ways: through accessing a PLANET™ Codes website or via transmission of electronic files sent to subscribing USPS customers.

CONFIRM®-barcoded mail pieces are scanned during the passage of the mail piece through various USPS processing facilities, but are not scanned (unless accompanied by Delivery Confirmation, Signature Confirmation, or similar final mail piece disposition service) upon actual delivery.

A POSTNET Code identifies a particular delivery address. A PLANET™ Code identifies a particular CONFIRM® Subscriber's mailing. If more than one mail piece in a single mailing is addressed to the same delivery address, then the CONFIRM® Service does not provide individual mail piece tracking.

The CONFIRM® service was designed to serve the high-volume mailer such as telemarketers and other businesses. High-volume mailers can benefit from tracking outbound mailings. For example, information about customer receipt of certain mailings would allow mailers to plan subsequent business activities, such as synchronizing telemarketing efforts with delivery of solicitations, or augmenting direct mail pieces with other advertising media.

The high-volume mailer basis for the CONFIRM® service is evident from the subscription fee structure charged by the U.S. Postal Service. The subscription fees, ranging from $2,000 for a three-month period, to an annual $10,000 fee, are based on the number of scans, measured in the millions.

Although large mailings are not normally the concern of individuals, individuals with low volume mailings could benefit from the ability to track processing and delivery of individual mail pieces. Low volume mailers will not be motivated to pay the high subscription fees for the U.S. Postal CONFIRM® Service. Even if they paid such fees, the CONFIRM® Service does not guarantee tracking of individual mail pieces.

Various private carriers provide individual parcel tracking, for a piece-based premium. And yet, no mail piece tracking is available for letters mailed using first class U.S. postage.

DELIVERY CONFIRMATION is another service provided by the U.S. Postal Service. DELIVERY CONFIRMATION provides the date, time and ZIP Code of delivery or attempted delivery. DELIVERY CONFIRMATION can be purchased for PRIORITY MAIL® items, Package Services parcels, STANDARD MAIL® parcels, and FIRST-CLASS MAIL® parcels, but is not available for use with FIRST-CLASS MAIL® letters.

A way for low-volume mailers to track individual outbound mail pieces is needed.

SUMMARY OF THE INVENTION

The exemplary embodiment of the present invention provides a way for low-volume mailers to track individual outbound mail pieces, including tracking of individual U.S. Postal Service FIRST-CLASS MAIL® letters. The exemplary embodiment of the present invention supports tracking of multiple mail pieces mailed by multiple mailers using a single computer-based postage system.

The exemplary embodiment of the present invention encodes a unique mail piece tracking identifier as a CONFIRM® service identifier in a graphic symbology. The unique mail piece tracking identifier of the exemplary embodiment of the present invention conforms with requirements of a CONFIRM® service identifier, while at the same time, provides, for a defined period of time, mail-piece-level uniqueness for first class and other mail class mail piece tracking.

Although the exemplary embodiment of the present invention is sometimes described herein with specific reference to tracking outbound first class mail pieces, it will be understood by someone with ordinary skill in the art that the present invention would apply equally to other classes of mail as long as the USPS, or other postal service, provides the CONFIRM® service, or a service such as, or similar to, CONFIRM® for that class of mail. It will be understood by someone with ordinary skill in the art that Express Mail, and mail pieces for which Delivery Confirmation or Signature Confirmation has been purchased, are assigned a unique tracking identifier with which a postal customer can track the delivery of the particular mail piece. However, in the case of Delivery Confirmation or Signature Confirmation pieces, only actual delivery, not progress through the postal system, can be tracked by virtue of the Delivery Confirmation or Signature Confirmation identifier. Further, in the case of PC Postage, Express Mail PC Postage is not specifically related in a computer system to a particular Express Mail Serial Number, but rather, is related to a date and delivery address. Further, in the case of PC Postage for Express Mail, Delivery Confirmation and Signature Confirmation pieces, although the PC Postage label itself is related to a particular mailer, the Express Mail, Delivery Confirmation or Signature Confirmation tracking number for the particular piece of mail is not related in a computer system to a particular mailer.

The exemplary embodiment of the present invention provides a method for tracking individual outbound mail pieces, said method comprising: assigning an identifier to a particular mail piece wherein said identifier uniquely identifies the particular mail piece during a particular period of time; and relating the unique mail piece identifier to a particular mailer.

The exemplary embodiment of the present invention provides a unique mail piece identifier graphic symbology, said unique mail piece identifier graphic symbology comprising: an encoded subscriber identifier; an encoded mailing identifier; and an encoded delivery address identifier, wherein the encoded delivery address identifier is unique within a combination of the encoded subscriber identifier and the encoded mailing identifier.

The exemplary embodiment of the present invention provides a method of encoding a unique mail piece identifier as a graphic symbology, said method comprising: assigning an identifier to a particular mail piece wherein said identifier uniquely identifies the particular mail piece during a particular period of time and wherein said identifier comprises a subscriber identifier, a mailing identifier, and a delivery address identifier, wherein the delivery address identifier is unique within a combination of the subscriber identifier and the mailing identifier.

BRIEF DESCRIPTION OF THE DRAWINGS

These and other features, aspects, and advantages of the present invention will become better understood with regard to the following description, appended claims, and accompanying drawings in which:

DETAILED DESCRIPTION OF THE INVENTION

In the exemplary embodiment of the present invention, a CONFIRM® Service subscriber obtains at least one subscriber identifier, such as by, among other things, paying the appropriate CONFIRM® Service subscription fee.

The exemplary CONFIRM® Service subscriber then resells CONFIRM® Service access to low volume individual mailers. Depending on the number of customers that use the exemplary CONFIRM® Service subscriber's services, the exemplary CONFIRM® Service subscriber may obtain a plurality of subscriber identifiers.

The exemplary mail piece tracking provider described herein is a CONFIRM® Service subscriber reseller. It will be understood by someone with ordinary skill in the art that the exemplary CONFIRM® Service subscriber reseller mail piece tracking embodiment of the present invention is illustrative and non-limiting, and that the present invention will be equivalently applicable to non-reseller embodiments.

Figure 2:
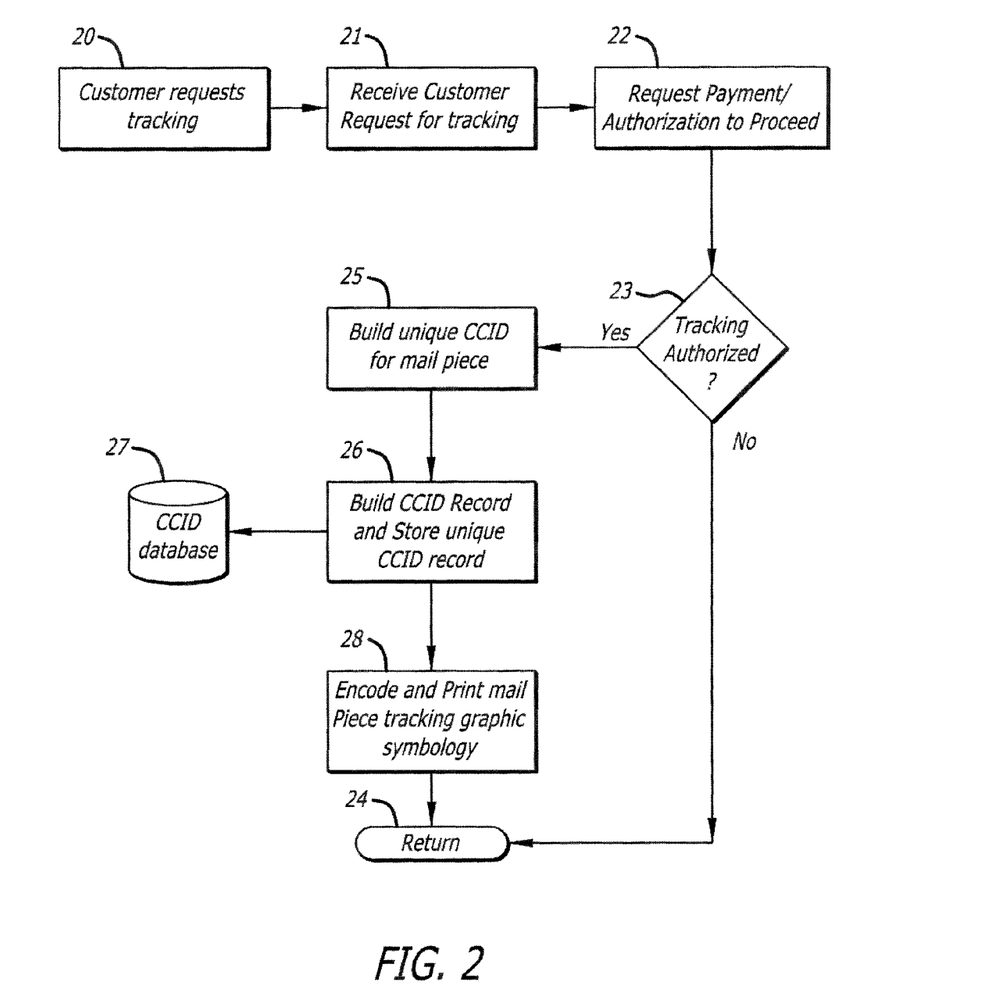
FIG. 2 is a high level logic flow diagram depicting an exemplary process for building and storing a unique mail piece tracking identifier in an exemplary embodiment of the present invention.

FIG. 2 is a high level logic flow diagram depicting an exemplary process for building and storing a unique mail piece tracking identifier in an exemplary embodiment of the present invention. As depicted in function block 20 of FIG. 2, a customer of the exemplary CONFIRM® Service subscriber reseller mail piece tracking provider requests that a particular mail piece be tracked. For each such mail piece requested by a customer to be tracked, the exemplary CONFIRM® Service subscriber reseller mail piece tracking provider computer system receives the customer's request, as depicted in function block 21 of FIG. 2, and will request from the customer payment and authorization to proceed, as depicted in function block 22 of FIG. 2, before proceeding to build a unique mail piece tracking identifier.

The exemplary embodiment of the present invention described herein is an Internet application of the present invention. It will be understood by someone with ordinary skill in the art that the exemplary Internet embodiment of the present invention is illustrative and non-limiting, and that the present invention will be equivalently applicable to non-Internet embodiments, including but not limited to, PC-based systems.

The exemplary embodiment of the present invention is implemented in an online Internet-based (or PC-based) postage system. The United States Postal Service (USPS) provides the Information Based Indicia Program (IBIP.) The IBIP facilitates PC-based (Personal Computer based) Postage, also sometimes referred to as computer-based, or Internet-based, Postage. With PC Postage, a user can purchase postage credit, and print the postage in the form of PC Postage onto a label or directly onto a mail piece. A PC Postage label provides a human-readable portion and a 2-dimensional barcode portion. The human-readable portion includes the postage value, mail class, the date, and optionally a logo. The barcode portion is intended to help thwart fraud, and includes information about the mail piece including the destination ZIP code, the amount of postage applied, the date and time the postage was applied, and a digital signature so that the USPS can validate the authenticity of the postage.

In one exemplary embodiment of PC Postage, a user subscribes to a third party Internet postage provider, such as, for example, Stamps.com (of Santa Monica, Calif.), and by using postage software made available by the Internet postage provider, postage value can be downloaded to the user's computer. The user can then print the postage indicia, by an ordinary laser or ink jet printer, directly onto the mail piece itself (e.g. onto business envelopes), onto a label to be applied to the mail piece, or alternately on an insert that can be placed into a window envelope so that it will show through a window envelope. Such postage software preferably works in conjunction with other software programs, such as word processing, accounting, database, and contact management software to allow a user to conveniently print PC Postage at the same time that addressee and bar code information is printed, and, in some cases of envelope printing, at the same time as the sender's return address is printed.

An example of a computer-based postage system is a software-based, online postage system described in U.S. patent application Ser. No. 09/163,993 filed on Sep. 29, 1998, by Mohan Ananda, entitled "On Line Postage System," the contents of which are hereby incorporated by reference as if set forth in full. The online postage system software comprises user code, also sometimes referred to as client software, that resides on a client system, and controller code, also sometimes referred to as server software, that resides on a server system. An exemplary on-line postage system may comprise a user system electronically connected to a server system, which in turn is connected to a USPS system. The server system is preferably capable of communicating with one or more client systems simultaneously.

It will be understood by someone with ordinary skill in the art that the present invention would be equivalently applicable in contexts other than an Internet-based tracking service provider, including, but not limited to, other PC- and computer-based systems.

Figure 1:
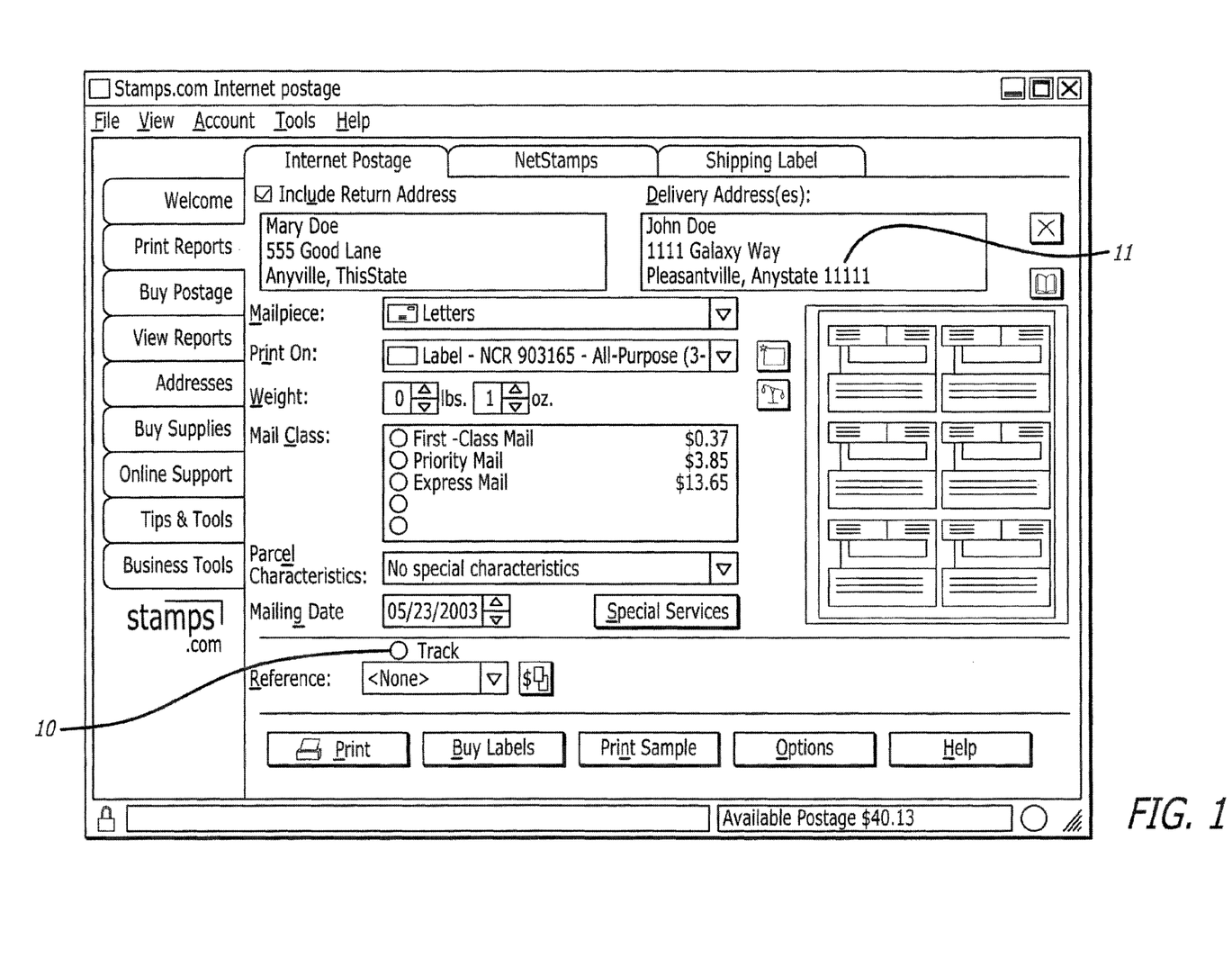
FIG. 1 is a graphic representation depicting an exemplary graphical user interface for obtaining a customer's request to track a particular mail piece in an exemplary embodiment of the present invention.

FIG. 1 is a graphic representation depicting an exemplary graphical user interface for obtaining a customer's request to track a particular mail piece. In the exemplary interface depicted in FIG. 1, the customer requests that a particular mail piece for which the customer is printing Internet FIRST-CLASS postage be tracked by clicking an onscreen tracking option button 10.

It will be understood by someone with ordinary skill in the art that there are many ways and formats with which to capture a customer's online request for a service, varying from pull down menus of selectable services, to clicking or otherwise indicating a particular option presented on a graphical user interface; the exemplary graphical user interface is illustrative and non-limiting.

In the exemplary embodiment, when a customer requests that a particular mail piece be tracked, a unique identifier is then assigned to the particular mail piece. The exemplary unique mail piece identifier comprises a specially assigned combination of a POSTNET Code and a PLANET™ CODE such that, for a defined period of time, the POSTNET Code is unique within the PLANET™ Code. This exemplary unique mail piece identifier is referred to herein as a "composite confirm ID" or "CCID."

PLANET™ Codes are 12- or 14-digit codes and can be represented as barcodes such as a one-dimensional barcode. The first two digits of a PLANET™ Code represent the type of CONFIRM® service: Destination CONFIRM® or Origin CONFIRM®.

For Destination CONFIRM®, the next 9, or 11, digits of the PLANET™ Code comprise a 5-digit Subscriber ID that is a unique identifier of the particular CONFIRM® subscriber and a 4-, or 6-, digit field defined by the particular mailer to identify the actual mailing. The $12^{th}$, or $14^{th}$, digit of the PLANET™ Code is a check-sum digit for error detection.

A POSTNET Code comprises a 5-digit ZIP code and, if the particular delivery address can be found in a postal address database, a 4-digit area code, and a 2-digit delivery address code. If the particular delivery address cannot be found in the postal address database, then, as long as the city, state and ZIP code of the delivery address are otherwise valid, the POSTNET Code comprises only the 5-digit ZIP code.

In the exemplary embodiment, the POSTNET Code for the exemplary POSTNET Code unique mail piece identifier is populated by the Internet Postage system with the appropriate 5-digit ZIP code, 4-digit area code, and 2-digit delivery address code fields obtained by the Internet Postage system in response to the customer's input of a delivery address 11.

In order for the composite confirm ID to uniquely identify a particular mail piece, the composite confirm ID needs to be unique for a time period that is at least as long as, or exceeds, the time expected to be required for the mail piece to be delivered, and scanned. In the exemplary embodiment of the present invention, the uniqueness time period will be set to 30, 60, 90 days, or for certain types of mail, permanent.

It will be understood by someone with ordinary skill in the art that the composite confirm ID (CCID) need not necessarily include the entire POSTNET Code to uniquely identify a mail piece. It is possible to use less than the full POSTNET Code to construct a unique mail piece identifier. For example, 1, 2 or more digits of the POSTNET Code could be used to construct a unique CCID. The number of digits of the POSTNET Code that would be needed to construct a unique CCID mail piece identifier would depend on circumstances regarding a particular CONFIRM® Service subscriber and the number of its customers.

As briefly previously mentioned above, the exemplary mail piece tracking provider is itself a CONFIRM® Service subscriber. As a CONFIRM® Service subscriber, the exemplary mail piece tracking provider registers with the U.S. Postal Service to obtain one or more subscriber identifiers (subscriber IDs). For non-limiting illustrative purposes only, three (3) exemplary subscriber IDs will be described herein, namely "01", "02" and "03." It will be understood by someone with ordinary skill in the art that more or less subscriber IDs could be used without departing from the spirit of the invention.

Continuing with FIG. 2, when a customer of the exemplary mail piece tracking provider requests 20 that a particular mail piece be tracked, the exemplary Internet Postage computer system receives 21 the tracking request and charges 22 the customer, such as through a pre-established account balance, an amount of money appropriate for the tracking of the particular mail piece. The system checks in step 23 to determine whether or not tracking is authorized. If the customer declines to pay for the tracking service, the system returns 24 to its other processing. If the customer has paid the requested amount, such as, e.g., by indicating (e.g., clicking on an online print button on a user interface (not shown)) authorization of the printing of an Internet Postage stamp and a tracking label, then the exemplary Internet Postage computer system builds 25, and assigns to the particular mail piece, a unique composite confirm ID (CCID) and stores 26 the assigned unique composite confirm ID, with other information described in more detail below, in a memory 27, such as in a database or lookup table. The memory storage of the assigned CCIDs is sometimes referred to herein, for nonlimiting illustrative purposes, as the "CCID database" 27.

Once the system has built and assigned a unique CCID to the particular mail piece, the system then encodes the CCID and prints 28 a mail piece tracking graphic symbology, that can be applied to the particular mail piece and that can then be scanned by the U.S. postal service. The general way in which data is encoded for printing as a graphic symbology is well known in the art. The particular requirements for encoding and printing a U.S. Postal CONFIRM® identifier is prescribed in U.S. Postal Service Publication 197, previously incorporated by reference herein for all purposes.

After encoding and printing 28 the mail piece tracking graphic symbology, the system returns 24 to its other processing.

Figure 3A:
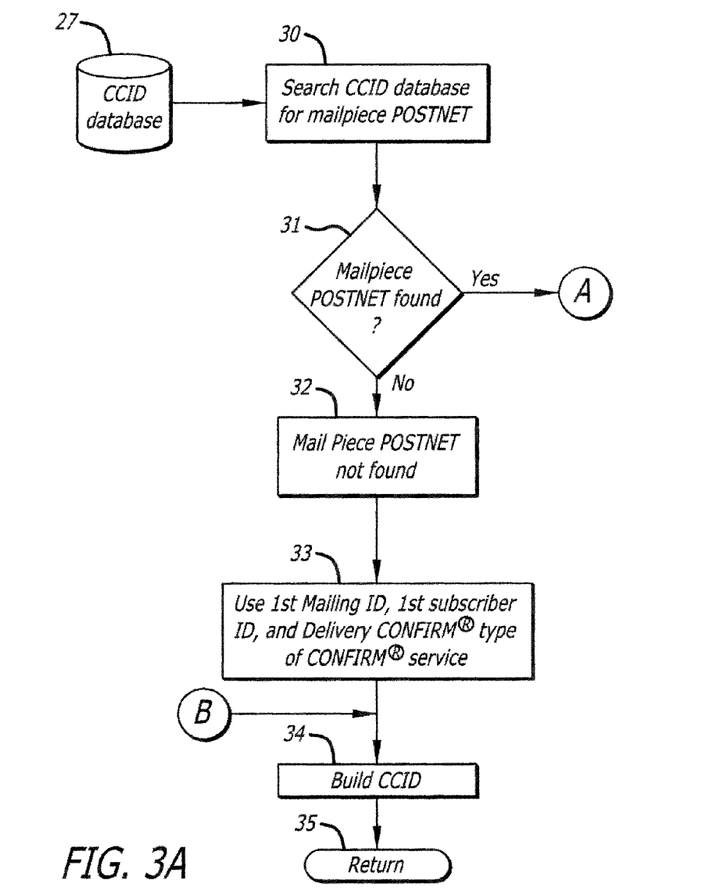
FIGS. 3A and 3B are high level logic flow diagrams depicting an exemplary process for building a unique mail piece tracking number in an exemplary embodiment of the present invention.
Figure 3B:
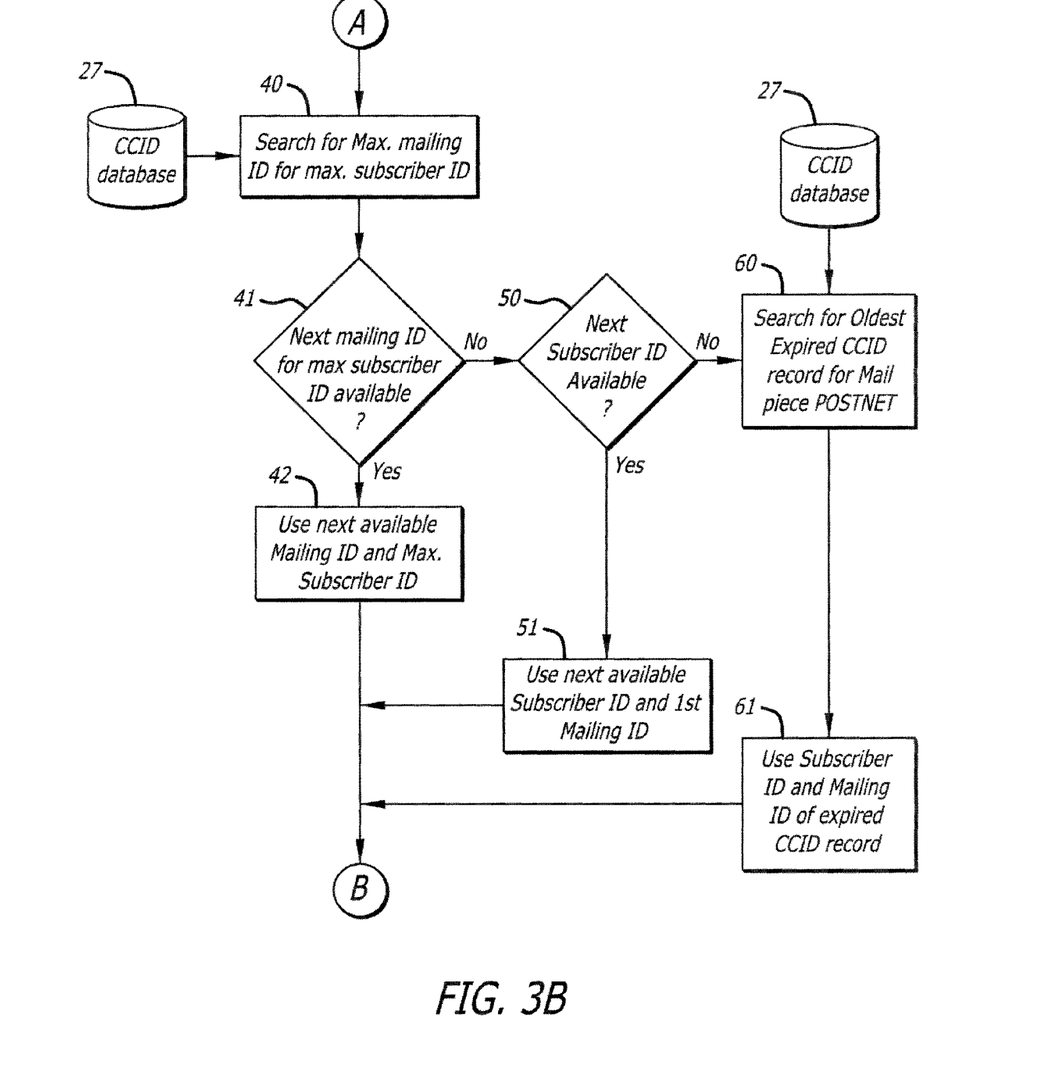

FIGS. 3A and 3B are high level logic flow diagrams depicting in more detail an exemplary process for building (element 25 in FIG. 2) a unique mail piece tracking number in an exemplary embodiment of the present invention. In order for the composite confirm ID to uniquely identify a particular mail piece, the exemplary Internet Postage computer system first searches 30 the CCID database 27 for a previously assigned composite confirm ID with the same POSTNET Code as the POSTNET Code of the particular mail piece for which tracking has been requested by the customer. That is, the exemplary Internet Postage computer system uses the POSTNET Code of the particular mail piece for which tracking has been requested by the customer as a lookup key.

In one alternative embodiment, instead of using only the POSTNET Code as the lookup key, a combination of POSTNET Code and mail class/service type code is used as a lookup key.

Continuing with FIGS. 3A and 3B, the exemplary Internet Postage computer system tests (test step 31, FIG. 3A) whether or not the mail piece POSTNET was found. If the POSTNET Code (or in the alternative embodiment, the combination of the POSTNET Code and mail class/service type code) does not exist 32 in the CCID database 27, then the exemplary Internet Postage computer system uses (in step 33) the first Mailing ID ("000001") and the first subscriber ID ("00001") to build 34 the unique composite confirm ID (CCID). The system then returns 35 to its other processing.

In the case in which the POSTNET Code (or in the alternative embodiment, the combination of the POSTNET Code and mail class/service type code) does not exist in the CCID database, in order to build the unique CCID, the exemplary Internet Postage computer system sets a first field (referred to herein as the "CCID type of CONFIRM® service") to a value designating that the CONFIRM® service type is "Destination" CONFIRM®. In the exemplary embodiment, the CCID type of CONFIRM® service field is a 2-digit field.

In the case in which the POSTNET Code (or in the alternative embodiment, the combination of the POSTNET Code and mail class/service type code) does not exist in the CCID database, in order to further build the unique CCID, the exemplary Internet Postage computer system sets a second field (referred to herein as the "CCID subscriber ID") in the CCID to a first subscriber ID, e.g., "00001". In the exemplary embodiment, the CCID subscriber ID is a 5-digit field.

The exemplary Internet Postage computer system sets a third field (referred to herein as the "CCID mailing ID") in the CCID to a first mailing ID, e.g., "000001". In the exemplary embodiment, the CCID mailing ID is a 6-digit field. In an alternative embodiment, the CCID mailing ID could be a 4-digit field.

The exemplary Internet Postage computer system sets a fourth field (referred to herein as the "CCID POSTNET") in the CCID to the POSTNET Code of the particular mail piece for which the customer has requested tracking. In the exemplary embodiment system, the customer mailer will have requested and paid for an Internet-based postage-indicia-bearing label to be printed with which to mail the particular mail piece. In those instances in which the customer mailer has provided the delivery address for the particular mail piece in order for the system to prepare the Internet-based postage-indicia-bearing label for the mail piece, the system will use the Internet-based postage-indicia-bearing label delivery address information supplied by the customer mailer with which to populate the CCID POSTNET.

In the alternative exemplary embodiment in which the lookup key includes both the POSTNET Code and the mail class/service type code, the exemplary alternative Internet Postage computer system would also set a fifth field (referred to herein as the "CCID service type") in the CCID to the mail class/service type of the mail piece for which the customer has requested tracking.

Once the exemplary Internet Postage computer system (sometimes referred to herein as the "system") has built a CCID, such as is depicted in function blocks 33-34 of FIGS. 3A-3B, to uniquely identify the mail piece to be tracked, the system builds a CCID record, as depicted in function block 26 in FIG. 2, for storage in the CCID database 27.

In building (function 26, FIG. 2) the CCID record, the system assigns a permanently unique "Print ID" to the just-built CCID and associates the Print ID with an identifier of the particular customer that requested tracking of the particular mail piece. The system then populates the CCID database record for storage with the following information: Print ID, CCID, Customer ID/Meter No., mailing date, time period required for uniqueness, print date (optional in some embodiments), amount of postage (optional in some embodiments), tracking fee (optional in some embodiments), and Mail Class/Service Type (optional in some embodiments). In one alternative embodiment, instead of storing in each CCID database record a time period during which the CCID must remain unique, the system would store an expiration date. Once the CCID database record has been built, the system stores the CCID database record in the CCID database.

As will be understood by someone with ordinary skill in the art, the above-identified data fields, in what is referred to herein as the CCID database record, are exemplary and non-limiting. In alternative embodiments, the CCID database record may contain links to other databases or tables in order to link the particular CCID database record to a particular customer.

Returning to FIGS. 3A-3B, if the POSTNET Code (or in the alternative embodiment, the combination of the POSTNET Code and mail class/service type code) already exists in the CCID database 27, then the exemplary Internet Postage computer system must first determine the next available unique combination of the subscriber ID and Mailing ID in order to build the unique composite confirm ID (CCID).

In order to determine the next available unique combination of the subscriber ID and Mailing ID, the system will search 40 for the CCID database record for the given POSTNET Code (or in the alternative embodiment, the combination of the POSTNET Code and mail class/service type code) with the highest (maximum) subscriber ID and the highest (maximum) Mailing ID. Depending on the computer language and database technology used, the search may be initiated by an instruction to give the CCID database record with the lookup POSTNET Code (or in the alternative embodiment, the combination of the lookup POSTNET Code and mail class/service type code) having the maximum subscriber ID and the maximum Mailing ID.

Once the system returns the CCID database record with the lookup POSTNET Code (or in the alternative embodiment, the combination of the lookup POSTNET Code and mail class/service type code) having the maximum subscriber ID and the maximum Mailing ID, the system determines 41 whether the next Mailing ID is available for the maximum subscriber ID. If the next Mailing ID is available for the maximum subscriber ID, the system then uses 42 the next available (next increment of) Mailing ID for that maximum subscriber ID to build 34 the unique CCID, and then returns 35 to the system's other processing.

If the next available Mailing ID exceeds the maximum allowable number (in the exemplary embodiment, "999999"), and the next available Mailing ID is "000001", the system then determines 50 whether the next subscriber ID is available. If the next subscriber ID is available, the system then uses 51 the next available subscriber ID and the first ("000001") Mailing ID for that subscriber ID and builds 34 the unique CCID and then returns 35 to the system's other processing.

If when the system attempts to use the next available Mailing ID and subscriber ID, there are no more available Mailing IDs for existing subscriber IDs, then the system searches 60 for existing CCID database records for the lookup POSTNET Code (or in the alternative embodiment, the combination of the lookup POSTNET Code and mail class/service type code), for which the Mailing date for the particular mail piece to be tracked exceeds the expiration date for the CCID database record. The expiration date will be either stored in the CCID database record, or can be calculated by adding the time period required for uniqueness that is stored in the CCID database record to the mailing date that is stored in the CCID database record.

When an expired CCID database record is returned to the system in response to the search with the mail piece lookup POSTNET Code (or in the alternative embodiment, the combination of the lookup POSTNET Code and mail class/service type code), the system "recycles" the CCID (in function 61, FIG. 3B)—the system updates the returned expired CCID database record by populating the record with information about the new CCID and print event in order to build 34 the unique CCID before returning 35 to the system's other processing.

The CCID conforms with the U.S. Postal Service's requirements for a U.S. Postal CONFIRM® service identifier, while at the same time, the CCID provides, for a defined period of time, mail-piece-level uniqueness for mail piece tracking.

As was previously described above with regard to FIG. 2, once the system has built 25 a CCID and a CCID Record, and has stored 26 the CCID record on the CCID database 27, the system encodes the CCID for printing as a graphic symbology, and prints the graphic symbology. In the exemplary embodiment of the present invention, the CCID-encoded graphic symbology is a bar code. In the exemplary embodiment, the system prompts the customer mailer to request a final indication by the customer mailer that the customer mailer is ready for the system to print the graphic symbology.

Once the exemplary embodiment system receives the customer mailer's go-ahead to print, the exemplary embodiment system prints 28 the CCID-encoded bar code on a label.

In an alternative exemplary embodiment of the present invention, an alternative approach is used to manage CCID life- and expiration-times. The alternative approach uses a first designated account group comprising a first set of subscriber IDs, e.g., subscriber ID 1, 2, and 3, for a designated first period of time, for example, 0-90 virtual relative calendar days. In this embodiment, a virtual relative calendar is used. According to the virtual relative calendar, the virtual relative calendar day is initialized to 0, and is then incremented by one for each real calendar day. During the first period of time, e.g., the first 90 virtual relative calendar days, of this alternative embodiment, the system would assign CCIDs with subscriber IDs from the first account group set of subscriber IDs, e.g., subscriber ID 1, 2, or 3. After the first period of time has expired, this alternative approach then uses a second designated account group comprising a second set of subscriber IDs, e.g., subscriber IDs 4, 5, and 6, for a designated second period of time, e.g., 91-180 virtual relative calendar days. During the second period of time, e.g., the 91-180 virtual relative calendar days, of this alternative embodiment, the system would assign CCIDs with subscriber IDs from the second account group set of subscriber IDs, e.g., subscriber ID 4, 5, or 6. After the second period of time expires, this alternative approach would then restart the virtual calendar to virtual relative calendar day zero and would begin again to assign CCIDs with subscriber IDs in the first account group.

It will be understood by someone with ordinary skill in the art that the description above of two account groups is illustrative and non-limiting; that the description above of each account group being comprised of three subscriber IDs is illustrative and non-limiting; and that the description above of a particular number of periods of time and of a particular number of days for each period of time is illustrative and non-limiting. More than two account groups could be used. Each account group could be comprised of more than three, or less than three, subscriber IDs. More than two periods of time could be used. And each time period could be set for more than 90 days, or less than 90 days. Further, each time period could be set for a different number of days relative to the number of days of each other time period.

In order to track the mail piece, before depositing the mail piece into the U.S. Postal Service mail stream, the customer mailer will affix the printed CCID-encoded bar code label to the mail piece on the delivery-address side of the mail piece in a position relative to the delivery address as specified and required by the U.S. Postal Service. The exemplary embodiment system instructs the customer mailer as to the proper placement of the CCID-encoded bar code label.

In the exemplary embodiment system, as described above, the customer mailer has requested and paid for the printing of one or more Internet-based postage-indicia-bearing labels, in some cases including a delivery address label, for affixing to the mail piece. In such case, the customer mailer will affix the Internet-based postage-indicia-bearing label(s), and, if applicable, the address label, and in some cases, a separate CCID-encoded bar code label. In some cases, instead of a single CCID-encoded bar code label, a label bearing a CCID PLANET™ Code barcode and another label bearing a CCID POSTNET Code barcode will be printed, depending on a label set configuration used by a customer mailer and designated to the exemplary embodiment system. It will be understood by someone with ordinary skill that, in yet other cases, the customer mailer could use alternative label set configurations and request printing of a postage-indicia-bearing label and a label bearing a CCID PLANET™ Code barcode; the address and POSTNET barcode could be pre-printed on a letter and visible through an envelope window, or could be printed directly on an envelope.

Once a mail piece bearing a graphic symbology encoding a CONFIRM® service ID has been deposited in the U.S. Postal Service mail stream, the U.S. Postal Service will scan the mail piece at various stages of processing. Each time a CONFIRM® service ID graphic symbology-bearing mail piece is scanned by the U.S. Postal Service, the scanned information, along with details about the scanning event, are electronically captured. Each scan of a mail piece results in the creation of a record containing the following information: Shipment ID, Postal Service facility, Facility ID (ZIP), Date of entry scan (in mm/dd/yyyy format), and time of entry scan (in hh:mm:ss format). The Shipment ID is the CONFIRM® service ID, which, in the case of a mail piece to which a customer mailer has prepared the CONFIRM® label using the exemplary embodiment system, comprises the CCID-encoded bar code label.

Scanned data is made available to each CONFIRM® subscriber in more than one way. According to U.S Postal Service Publication 197, the U.S. Postal Service can provide a subscriber with scanned information though File Transfer Protocol (FTP). The U.S. Postal Service also makes scanned information available via password-protected access of a Web site, www.planetcodes.com.

Figure 4:
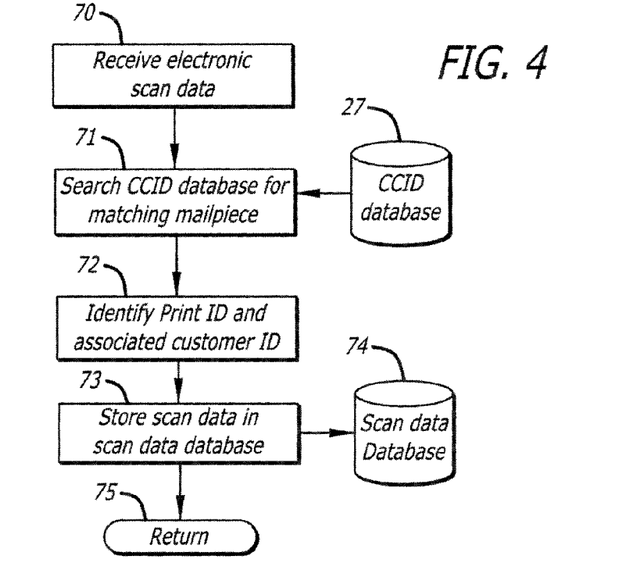
FIG. 4 is a high level logic flow diagram depicting an exemplary process for processing electronic scan data in an exemplary embodiment of the present invention.

FIG. 4 is a high level logic flow diagram depicting an exemplary process for processing electronic scan data in an exemplary embodiment of the present invention. As depicted in FIG. 4, the exemplary embodiment system receives 70 the electronic scan data from the U.S. Postal Service in one of the available ways. When the exemplary embodiment system receives electronic scan records, for each received electronic scan record, the system searches 71 the CCID database 27 to identify a non-expired CCID record matching the Shipment ID of the scanned record. When the exemplary embodiment system identifies a non-expired CCID record matching the Shipment ID of a particular scanned record, the system identifies 72 the Print ID, and the correlating customer mailer ID, associated with the CCID record. The system then stores 73 the electronic scan record, and associated Print ID and customer mailer ID information, in a scan data database 74 before returning 75 to other system processing.

It will be understood by someone with ordinary skill in the art that the databases identified herein and the database data relationships described herein could be configured in various ways; that the non-limiting exemplary databases identified and their configurations are provided for non-limiting illustrative purposes.

The exemplary system can report the scan data for a particular customer's mail piece in various ways. The exemplary system will ask the user before the time that the CCID mail piece tracking label is printed how the user wants to receive information about the mail piece status during processing and at delivery. Among other ways, the exemplary system will provide mail piece tracking status reporting via the following non-limiting exemplary types of reports: on a website, via email to the receiver and/or the sender, via a look-up from a print history of the Internet-based postage system, email notification of expected delivery, wireless notification of expected delivery, and phone look-up.

Figure 5:
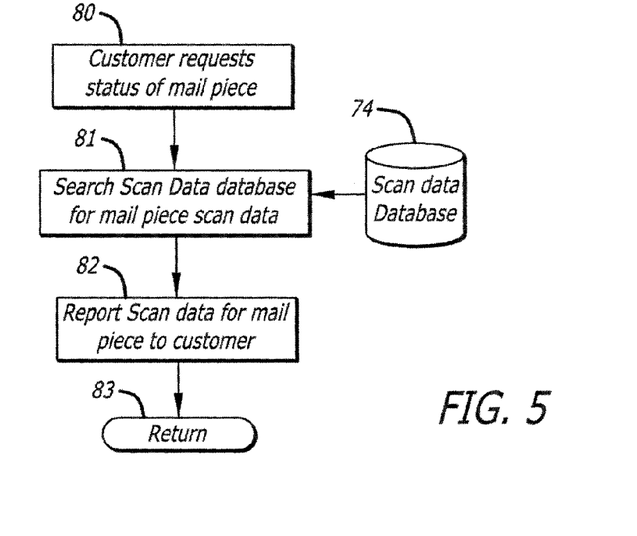
FIG. 5 is a high level logic flow diagram depicting an exemplary process for reporting mail piece tracking information to a customer.

FIG. 5 is a high level logic flow diagram depicting an exemplary process for reporting mail piece tracking information to a customer. As depicted in FIG. 5, when a customer requests 80 status of a particular mail piece, the system will search 81 the scan data database 74 for information about the particular mail piece. When the system locates information about the particular mail piece, the system will report 82 the mail piece status to the customer before returning 83 to other system processing. In the exemplary embodiment, the system will report all scan data received for that particular mail piece.

In addition to customer-based reporting, the system will also provide system-wide reporting, including, by non-limiting example: mass mailing reports of everything in the system, facility problem reports, reports of items that have never been scanned, reports of items that were scanned at least once, but have disappeared, average delivery time of mail pieces, average delivery time by region, and average delivery time by mail service class.

Figure 6:
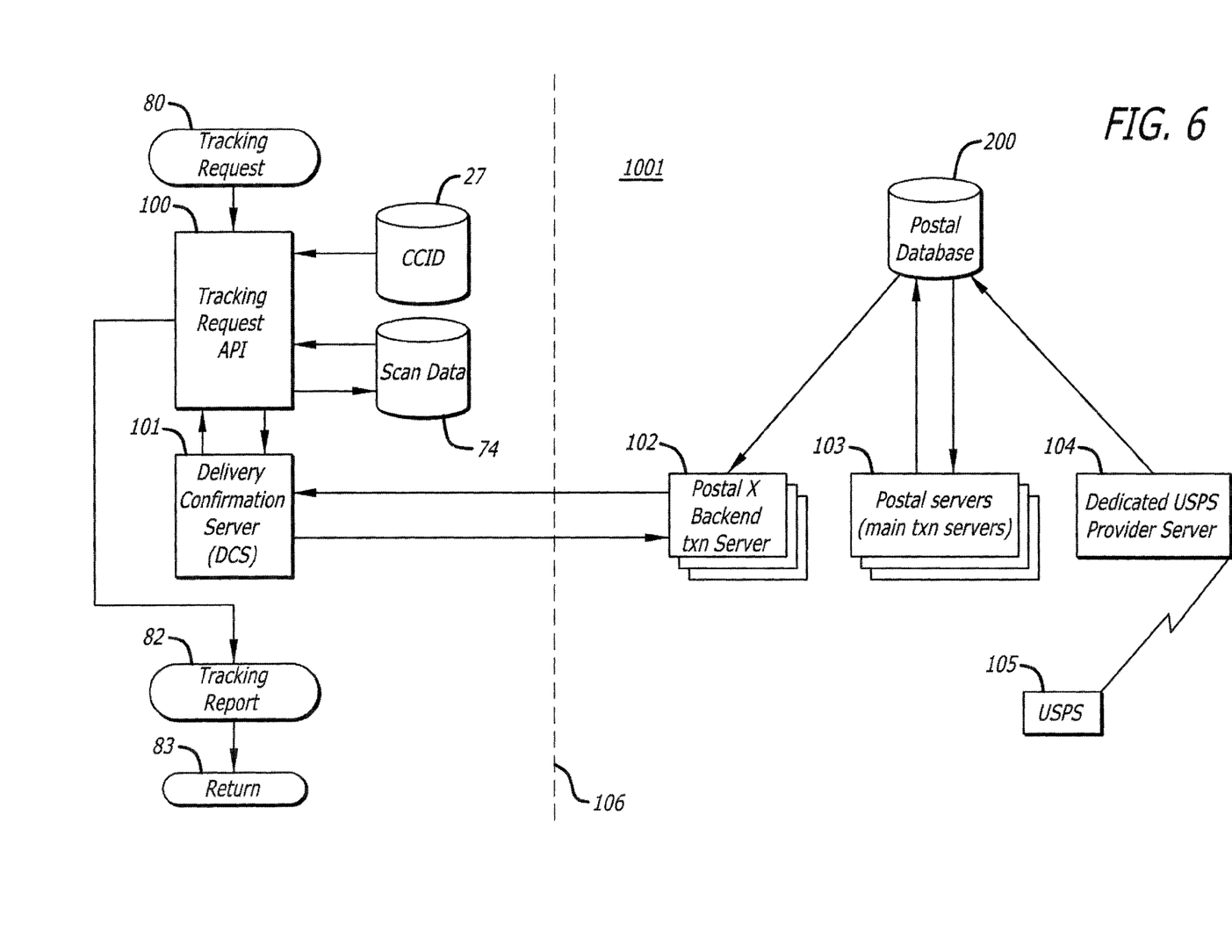
FIG. 6 is a block diagram depicting an exemplary configuration of server computers and a tracking applications program interface for facilitating tracking of mail pieces in an exemplary embodiment of the present invention.

FIG. 6 is a block diagram depicting an exemplary configuration of server computers and a tracking applications program interface for facilitating tracking of mail pieces in an exemplary embodiment of the present invention. FIG. 6 depicts, in a server environment context, an exemplary system configuration for processing mail piece tracking information and for reporting that information to a customer based on a specific tracking request.

As depicted in FIG. 6, one to a plurality of postal server computers 103 are provided. The postal server computers 103 serve as main transaction servers for the postal system 1001 (the system to the left of the dotted line 106-106). The postal server computers 103 access the postal database 200. The postal database 200 contains, among other things, information about each registered postal meter, registration information for each customer to which each respective postal meter is registered, CONFIRM® scan events, CONFIRM® exceptions, CONFIRM® fraud detection statistics, refund information, and other types of information. A dedicated USPS Provider Server 104 is provided for accessing a USPS system 105 provided by the USPS.

As depicted in FIG. 6, one to a plurality of postal X server computers 102 are provided. The postal X server computers 102 serve as backend transaction servers. The postal X server computers 102 respond to requests from transaction-specific type servers, such as a Delivery Confirmation Server 101.

The Delivery Confirmation Server 101 provides a tracking request Application Program Interface (API) 100. The tracking request API 100 is a program interface that receives and processes API requests comprising electronic objects of a particular type. Herein, reference to an API Server, or to API Servers, refers to one or more server computers that are programmed to perform various activities comprising particular API functions, including but not limited to receiving and translating various types of API requests and composing and transmitting various types of API responses to the appropriate party's system.

In an exemplary embodiment of the invention, the tracking request API 100 retrieves and processes tracking API requests in the form of XML (Extensible Markup Language) documents. XML is a markup language for electronic documents. A mark up language such as XML uses certain defined delimiters and tag names to designate meaning and/or organization of marked text within an electronic document.

As depicted in FIG. 6, the exemplary system Tracking Request Applications Program Interface (API) 100 would process mail piece scan data, and would store mail piece scan data on the scan data database 74. The Tracking Request API 100 would respond to tracking requests 80 input by a user with a report of mail piece tracking events.

Trademarks

CONFIRM®, PRIORITY MAIL®, STANDARD MAIL®, and FIRST-CLASS MAIL® are registered trademarks of the United States Postal Service. PLANET™ and associated logos are trademarks of the United States Postal Service. The names of actual companies and products mentioned herein may be the trademarks of their respective owners.

Facsimile Reproduction of Copyright Material

A portion of the disclosure of this patent document contains material which is subject to copyright protection by the copyright owner, Stamps.com Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A computer-implemented method for a first class mail piece tracking provider to provide, to a plurality of customers of the first class mail piece tracking provider, tracking of individual outbound first class mail pieces respectively initiated in a mail stream by respective customers of the plurality of customers, said computer-implemented method implemented using a computer-based postage system programmed for operation on behalf of the first class mail piece tracking provider, said computer-based postage system available for communication with each respective customer of the plurality of customers, said computer-implemented method comprising:

receiving, by the computer-based postage system, from a particular customer of the plurality of customers of the first class mail piece tracking provider, a request for a computer-based postage indicium to mail a particular first class mail piece to a delivery address;

determining, by the computer-based postage system, a delivery address identifier corresponding to the delivery address;

searching, by the computer-based postage system, a computer-accessible memory for a previously-used first class mail piece tracking identifier comprising the delivery address identifier, a highest-previously-used subscriber identifier, and a highest-previously-used mailing identifier;

modifying, by the computer-based postage system, at least one of the highest-previously-used subscriber identifier and the highest-previously-used mailing identifier until determining, by the computer-based postage system, a next first class mail piece tracking identifier that has not been used during a particular period of time, said next first class mail piece tracking identifier comprising the delivery address identifier, a final version of the subscriber identifier, and a final version of the mailing identifier;

assigning, by the computer-based postage system, the next first class mail piece tracking identifier to the particular first class mail piece;

generating the computer-based postage indicium according to the request for the computer-based postage indicium; and creating, by the computer-based postage system, a particular machine-readable tracking graphic symbology, separate from said computer-based postage indicium, said particular machine-readable tracking graphic symbology encoding the next first class mail piece tracking identifier;

wherein the highest-previously-used subscriber identifier and the final version of the subscriber identifier are from a group of a plurality of subscriber identifiers that have been assigned to the first class mail piece tracking provider, the plurality of subscriber identifiers identifying the first class mail piece tracking provider in a tracking service authorized by a postal authority.

2. The computer-implemented method of claim 1, said computer-implemented method further comprising:

facilitating, by the computer-based postage system, fixing the particular machine-readable tracking graphic symbology in a visual medium, said visual medium adapted for physical association with the particular first class mail piece.

3. The computer-implemented method of claim 2, said computer-implemented method further comprising:

physically associating the visual medium in which the particular machine-readable tracking graphic symbology is fixed with the particular first class mail piece.

4. The computer-implemented method of claim 3, said computer-implemented method further comprising:

receiving, by the computer-based postage system, a request from the particular customer for tracking information regarding the particular first class mail piece.

5. The computer-implemented method of claim 4, said computer-implemented method further comprising:

searching, by the computer-based postage system, a set of scan records comprising records of scans of a plurality of machine-readable tracking graphic symbologies performed by the postal authority for a first class mail piece tracking identifier that matches the next first class mail piece tracking identifier.

6. The computer-implemented method of claim 5, said computer-implemented method further comprising:

determining, by the computer-based postage system, that a particular scan record comprises the first class mail piece tracking identifier that matches the next first class mail piece tracking identifier; and reporting, by the computer-based postage system, to the particular customer, a set of tracking information associated with the particular scan record.

7. The computer-implemented method of claim 1, wherein the delivery address identifier is obtained from Internet-based postage delivery address information.

8. The computer-implemented method of claim 1, said computer-implemented method further comprising:

formatting, by the computer-based postage system, the particular machine-readable tracking graphic symbology as a bar code for print-rendering as a label for the particular first class mail piece.

9. The computer-implemented method of claim 8, said computer-implemented method further comprising:

physically associating the label with the particular first class mail piece.

10. The computer-implemented method of claim 1, wherein creating, by the computer-based postage system, the particular machine-readable tracking graphic symbology comprises creating, by the computer-based postage system, a machine-readable bar code.

11. The computer-implemented method of claim 1, said computer-implemented method further comprising:
    facilitating, by the computer-based postage system, fixing the particular machine-readable tracking graphic symbology in a first visual medium, said first visual medium adapted for physical association with the particular first class mail piece; and
    facilitating, by the computer-based postage system, fixing the computer-based postage indicium in a second visual medium, said second visual medium adapted for physical association with the particular first class mail piece.

12. The computer-implemented method of claim 11, wherein the first visual medium is a first label and wherein the second visual medium is a second label.

13. The computer-implemented method of claim 1, wherein said next first class mail piece tracking identifier further comprises a tracking service type identifier.

14. A computer program product, comprising a non-transitory computer-readable medium having a computer-readable program code embodied therein, said computer-readable program code adapted to be executed by a computer system to implement a method for a first class mail piece tracking provider to provide, to a plurality of customers of the first class mail piece tracking provider, tracking of individual outbound first class mail pieces respectively initiated in a mail stream by respective customers of the plurality of customers, said computer system programmed for operation on behalf of the first class mail piece tracking provider, said computer system available for communication with each respective customer of the plurality of customers, said method comprising:
    receiving from a particular customer of the plurality of customers of the first class mail piece tracking provider, a request for a computer-based postage indicium to mail a particular first class mail piece to a delivery address;
    determining a delivery address identifier corresponding to the delivery address;
    searching a computer-accessible memory for a previously-used first class mail piece tracking identifier comprising the delivery address identifier, a highest-previously-used subscriber identifier, and a highest-previously-used mailing identifier;
    modifying at least one of the highest-previously-used subscriber identifier and the highest-previously-used mailing identifier until determining a next first class mail piece tracking identifier that has not been used during a particular period of time, said next first class mail piece tracking identifier comprising the delivery address identifier, a final version of the subscriber identifier, and a final version of the mailing identifier;
    assigning the next first class mail piece tracking identifier to the particular first class mail piece;
    generating the computer-based postage indicium according to the request for the computer-based postage indicium; and
    creating a particular machine-readable tracking graphic symbology, separate from said computer-based postage indicium, said particular machine-readable tracking graphic symbology encoding the next first class mail piece tracking identifier;
    wherein the highest-previously-used subscriber identifier and the final version of the subscriber identifier are from a group of a plurality of subscriber identifiers that have been assigned to the first class mail piece tracking provider, the plurality of subscriber identifiers identifying the first class mail piece tracking provider in a tracking service authorized by a postal authority.

15. The computer program product of claim 14, said method further comprising:
    facilitating fixing the particular machine-readable tracking graphic symbology in a visual medium, said visual medium adapted for physical association with the particular first class mail piece.

16. The computer program product of claim 15, said method further comprising:
    physically associating the visual medium in which the particular machine-readable tracking graphic symbology is fixed, with the particular first class mail piece.

17. The computer program product of claim 16, said method further comprising:
    receiving a request from the particular customer for tracking information regarding the particular first class mail piece.

18. The computer program product of claim 17, said method further comprising:
    searching a set of scan records comprising records of scans of a plurality of machine-readable tracking graphic symbologies performed by the postal authority for a first class mail piece tracking identifier that matches the next first class mail piece tracking identifier.

19. The computer program product of claim 18, said method further comprising:
    determining that a particular scan record comprises the first class mail piece tracking identifier that matches the next first class mail piece tracking identifier; and
    reporting, to the particular customer, a set of tracking information associated with the particular scan record.

20. The computer program product of claim 14, wherein the delivery address identifier is obtained from Internet-based postage delivery address information.

21. The computer program product of claim 14, said method further comprising:
    formatting the particular machine-readable tracking graphic symbology as a bar code for print-rendering as a label for the particular first class mail piece.

22. The computer program product of claim 21, said method further comprising:
    physically associating the label with the particular first class mail piece.

23. The computer program product of claim 14, wherein creating the particular machine-readable tracking graphic symbology comprises creating a machine-readable bar code.

24. The computer program product of claim 14, said method further comprising:
    facilitating fixing the particular machine-readable tracking graphic symbology in a first visual medium, said first visual medium adapted for physical association with the particular first class mail piece; and
    facilitating fixing the computer-based postage indicium in a second visual medium, said second visual medium adapted for physical association with the particular first class mail piece.

25. The computer program product of claim 24, wherein the first visual medium is a first label and wherein the second visual medium is a second label.

26. The computer program product of claim 14, wherein said next first class mail piece tracking identifier further comprises a tracking service type identifier.

\* \* \* \* \*